United States Patent
Baumecker et al.

(10) Patent No.: US 11,433,822 B2
(45) Date of Patent: Sep. 6, 2022

(54) NET ASSEMBLY FOR A VEHICLE

(71) Applicant: Brose Fahrzeugteile SE & Co. Kommanditgesellschaft, Coburg, Coburg (DE)

(72) Inventors: Matthias Baumecker, Berlin (DE); Lucas Becker, Berlin (DE); Tobias Baumann, Berlin (DE)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 278 days.

(21) Appl. No.: 16/631,914

(22) PCT Filed: Jul. 11, 2018

(86) PCT No.: PCT/EP2018/068797
§ 371 (c)(1),
(2) Date: Jan. 17, 2020

(87) PCT Pub. No.: WO2019/016046
PCT Pub. Date: Jan. 24, 2019

(65) Prior Publication Data
US 2020/0156551 A1    May 21, 2020

(30) Foreign Application Priority Data
Jul. 18, 2017   (DE) ............... 10 2017 212 267.6

(51) Int. Cl.
*B60R 7/00*    (2006.01)
*B60P 7/08*    (2006.01)
(Continued)

(52) U.S. Cl.
CPC ............ *B60R 7/005* (2013.01); *B60P 7/0876* (2013.01); *B60R 5/047* (2013.01); *B60R 2011/0043* (2013.01); *B60R 2011/0082* (2013.01)

(58) Field of Classification Search
CPC ......... B60R 5/044; B60R 5/045; B60R 5/047; B60R 7/005; B60P 7/0876
(Continued)

(56) References Cited

U.S. PATENT DOCUMENTS 7,900,646 B2 *   3/2011   Miller ................... E04H 15/44
                                                        135/130
11,001,190 B1 *  5/2021   Dahl .................... B60P 7/0838
(Continued)

FOREIGN PATENT DOCUMENTS

DE           10220496 A1   11/2003
DE       602004011395 T2    1/2009
(Continued)

*Primary Examiner* — Jason S Morrow
*Assistant Examiner* — Wenwei Zhou
(74) *Attorney, Agent, or Firm* — Brooks Kushman P.C.

(57) ABSTRACT

A net assembly for a vehicle, comprising an assembly of rod elements, each of which has a guide channel; a plurality of joint elements, each of which has at least one connection opening, wherein the rod elements are connected together via the joint elements; and at least one tensioning element which extends through the guide channels of at least some of the rod elements and the connection openings of at least some of the joint elements and can be tensioned in order to clamp the rod elements relative to the joint elements. In this manner, a net assembly is provided which can be used in a variable manner, the shape of which can be adapted in a flexible manner, and which can thus be used to withstand forces.

21 Claims, 7 Drawing Sheets

(51) Int. Cl.
*B60R 5/04* (2006.01)
*B60R 11/00* (2006.01)

(58) Field of Classification Search
USPC .................................. 280/749; 410/97, 100
See application file for complete search history.

(56) References Cited

U.S. PATENT DOCUMENTS

2002/0153034 A1   10/2002  Miller
2007/0194583 A1    8/2007  Coles et al.
2021/0403231 A1* 12/2021  Roberge-Gordon ..... D07B 1/14

FOREIGN PATENT DOCUMENTS

| DE | 102007048895 A1 | 4/2009 |
| DE | 102014218256 A1 | 3/2016 |
| DE | 102015220559 A1 | 4/2017 |
| WO | 2008011375 A2 | 1/2008 |

\* cited by examiner

NET ASSEMBLY FOR A VEHICLE

CROSS-REFERENCE TO RELATED APPLICATIONS

This application is the U.S. National Phase of PCT Application No. PCT/EP2018/068797 filed on Jul. 11, 2018, which claims priority to German Patent Application No. DE 10 2017 212 267.6, filed on Jul. 18, 2017, the disclosures of which are hereby incorporated in their entirety by reference herein.

TECHNICAL FIELD

The present disclosure relates to a net assembly, such as a net assembly for use in a vehicle.

BACKGROUND

Conventionally, a net assembly can be provided, for example, in a vehicle luggage compartment, the net assembly serving as a flexible net, for example, for covering luggage or other goods in the vehicle luggage compartment and being fastened, for example, to the vehicle floor in such a manner that the load cannot slip during motion of the vehicle.

Additionally or alternatively, a vehicle luggage compartment can be provided with a luggage compartment covering in the manner of a roller screen which can be moved between different positions in order to cover a vehicle luggage compartment, for example, in the case of a station wagon.

A net assembly which is useable, for example, as a covering and which can firstly be flexibly adapted in its shaping (as is the case with conventional nets) but can also provide rigid support of forces is desirable.

SUMMARY

One or more objects of the present disclosure may be to provide a net assembly for use in a vehicle, which can be used in a variable manner, can be adapted flexibly in its shaping and can be configured for supporting forces.

In one or more embodiments, the net assembly may include an assembly of rod members which each have a guide channel, a plurality of joint elements which each have at least one connecting opening, wherein the rod members are connected to one another via the joint elements, and at least one tensioning element which extends through the guide channels of at least some of the rod members and through the connecting openings of at least some of the joint elements and can be tensioned in order to brace the rod members in relation to the joint elements.

The net assembly may be formed by rod members and joint elements connecting the rod members to one another. The rod members extend in a rod-shaped manner and may have (at least very substantially) a rigid formation. The joint elements serve for connecting the rod members to one another in such a manner that the rod members can be adapted in their position with respect to one another such that the net assembly can be varied flexibly in its shape.

The rod members and the joint elements may be configured to be braced together via one or more tensioning elements. Depending on the state of tension of the tensioning element, the rod members are held in position with respect to one another such that forces can be absorbed and supported by the net assembly, or the rod members are adjustable with respect to the joint elements such that the net assembly can be adapted in its shape.

The rod members each have two ends. The guide channel may extend longitudinally between the ends of a respective rod member. The tensioning element may be guided longitudinally through the rod member, with a respective joint element adjoining the ends of the rod member.

Each rod member may lie in a sliding manner against two joint elements. For this purpose, a respective contact surface which is in contact in a sliding manner with a respectively associated joint element can be formed at the ends of each rod member. A plain bearing is therefore provided between the rod member and an associated joint element, said plain bearing enabling the rod member to pivot in relation to the joint element at least about a certain angle.

Bracing of the rod members with the joint elements causes the position of the rod members with respect to the joint elements to be locked, because of a frictional connection between the rod members and the joint elements. When the tensioning element is sufficiently tensioned, the net assembly is therefore fixed in its shape, and therefore forces can be absorbed and conducted away at the net assembly in order, for example, to provide support in a luggage compartment of a vehicle.

In order to improve the support of the rod members at the joint elements, it is possible, for example, for positive locking elements, for example in the form of (rounded) tooth elements, to be provided on the contact surfaces of the ends of the rod members and on the joint elements, said positive locking elements bringing about a positive locking support between the rod members and the joint elements when the tensioning element is braced. If the tensioning element is relaxed, the rod members can be moved relative to the joint elements by the positive locking elements sliding over one another.

The joint elements may be configured, for example, as ball elements. The joint elements therefore have a spherical shape on which associated rod members are supported.

In one or more embodiments, the rod members may be arranged with respect to the joint elements in such a manner that a joint element in each case follows a rod member and a rod member in each case follows a joint element. The tensioning element extends here through the alternating sequence of the rod members and the joint elements in such a manner that the rod members and the joint elements can be braced with respect to one another by tension at the tensioning element.

In one or more embodiments, a joint element is correspondingly arranged between two adjacent rod members. The two adjacent rod members can be pivotable here, for example, in each case about a pivot axis with respect to the joint element arranged in between, for example by contact surfaces of the rod members sliding along the spherical surface of the joint element. The tensioning element extends here from the guide channel of one of the two adjacent rod members through the connecting opening of the joint element arranged between the two adjacent rod members, into the guide channel of the other of the two adjacent rod members, and therefore the two adjacent rod members with the interposition of the joint element can be braced with respect to each other via the tensioning element.

In one or more embodiments, the two adjacent rod members extend at an angle with respect to each other, for example at an angle of between 45° and 135°. The tensioning element is guided between the rod members and therefore likewise extends at an angle such that the connecting opening within the joint element arranged between the rod members is correspondingly curved in order to deflect the tensioning element.

The movability of the adjacent rod members with respect to the joint element arranged in between is predetermined, for example, by angular openings via which the tensioning element enters the joint element or exits from the joint element. The angular openings serve to guide the tensioning element from the one rod member into the joint element and toward the other rod member such that the tensioning element is guided from the guide channel of the one rod member into the connecting opening and on in the direction of the guide channel of the other rod member.

The angular openings may be in each case formed in a slot-shaped manner along a pivoting plane, along which the associated rod member is pivotable with respect to the joint element. The angular openings may widen from the connecting opening in the pivoting plane, for example with an opening angle of between 45° and 90°. The pivoting angle is predetermined via the opening angle of the angular opening, by which pivoting angle the associated rod member can be pivoted with respect to the joint element. Only within the angular range of the opening angle of the angular opening is it possible for the tensioning element to extend from the guide channel of the rod member via the angular opening toward the connecting opening of the joint element, and therefore the slot-shaped extent of the angular opening predetermines and limits the pivoting path of the rod member relative to the joint element.

In one or more embodiments, in each case two pairs of adjacent rod members lie against the joint elements. This creates a net assembly having, for example, diamond-shaped net openings which are bounded by the rod members and which can be adapted in their shaping by the movability of the rod members with respect to the joint elements.

The pairs of adjacent rod members at a joint element can be assigned two different tensioning elements or two portions of the same tensioning element.

If one joint element is assigned two pairs of adjacent rod members, the joint element correspondingly has two connecting openings with in each case two angular openings in which the different tensioning elements or the different portions of the same tensioning element are guided. The connecting openings can be curved in an opposed manner with respect to each other here such that the rod members extend from the joint element in a mirror-symmetrical manner.

In one or more embodiments, the tensioning element extends along a neutral fiber through the rod members and the joint elements. During a pivoting movement of the rod members relative to one another, a change in length of an extension path, along which the tensioning element extends through the rod members and the joint elements, accordingly does not occur. The tension provided via the tensioning element is therefore independent of the pivoting position of the rod members with respect to one another.

Alternatively, the tensioning element can also extend outside the neutral fiber. In this case, the net assembly may have a tensioned position(s), in the direction of which the net assembly is adjusted when the tensioning element is tensioned.

Additionally or alternatively, when the tensioning element is relaxed, the net assembly may have a relaxed position(s), in the direction of which the net assembly is adjusted when the tensioning element is not tensioned. Such a relaxed position may be be predetermined, for example, by suitable shaping at the contact surfaces of the rod members and the bearing surfaces of the joint elements.

The tension at the tensioning element can be set and changed, for example, via one or more servo motors. One or more servo motors here can be part of a tensioning device which, for example, has a tensioning strip on which one or more tensioning elements for bracing the rod members and the joint elements with respect to one another are arranged.

Additionally or alternatively, the net assembly can also have one or more spring elements for elastically tensioning the rod members and the joint elements with respect to one another. The one or more spring elements can act on the at least one tensioning element in order to elastically pretension the latter. The net assembly is therefore inherently elastic and can optionally be deformed by overcoming the elastic pretension.

In one or more embodiments, the net assembly is arranged on a winding device, for example on a winding shaft, which can be driven by electric motor or by a spring mechanism. The net assembly can be wound onto the winding device, for example when the tensioning element is relaxed, in order thereby to stow the net assembly, and the net assembly can be unwound from the winding device in order, for example, to cover a region in a luggage compartment of a vehicle.

Alternatively, the net assembly can be accommodated, for example, in a suitable depression in or on a vehicle (what is referred to as a negative impression, for example in a luggage compartment floor).

A net assembly of the type described here can, for example, bring about a luggage compartment covering for a vehicle. Such a luggage compartment covering can cover a luggage compartment floor and can be configured to cover and to fix goods in the region of the luggage compartment floor, wherein goods can be held and supported in a precisely fitting manner by the flexible adaptation of the shape of the net assembly. Alternatively, the net assembly can also be arranged above a luggage compartment floor in order to cover the luggage compartment from above and for this purpose can be fastened, for example, on the rear side to a rear seat arrangement.

However, a net assembly of the type described may also be used in an entirely different use in a vehicle. For example, such a net assembly can provide a separation between a luggage compartment and a seat region of the vehicle. However, such a net assembly can also replace a seat belt in a vehicle in order to secure passengers on a vehicle seat. In addition, it is conceivable to use such a net assembly, for example, as a snow chain by the net assembly circumferentially surrounding a tire of the vehicle.

BRIEF DESCRIPTION OF THE DRAWINGS

The concept on which the invention is based will be explained in more detail below with reference to the exemplary embodiments illustrated in the figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
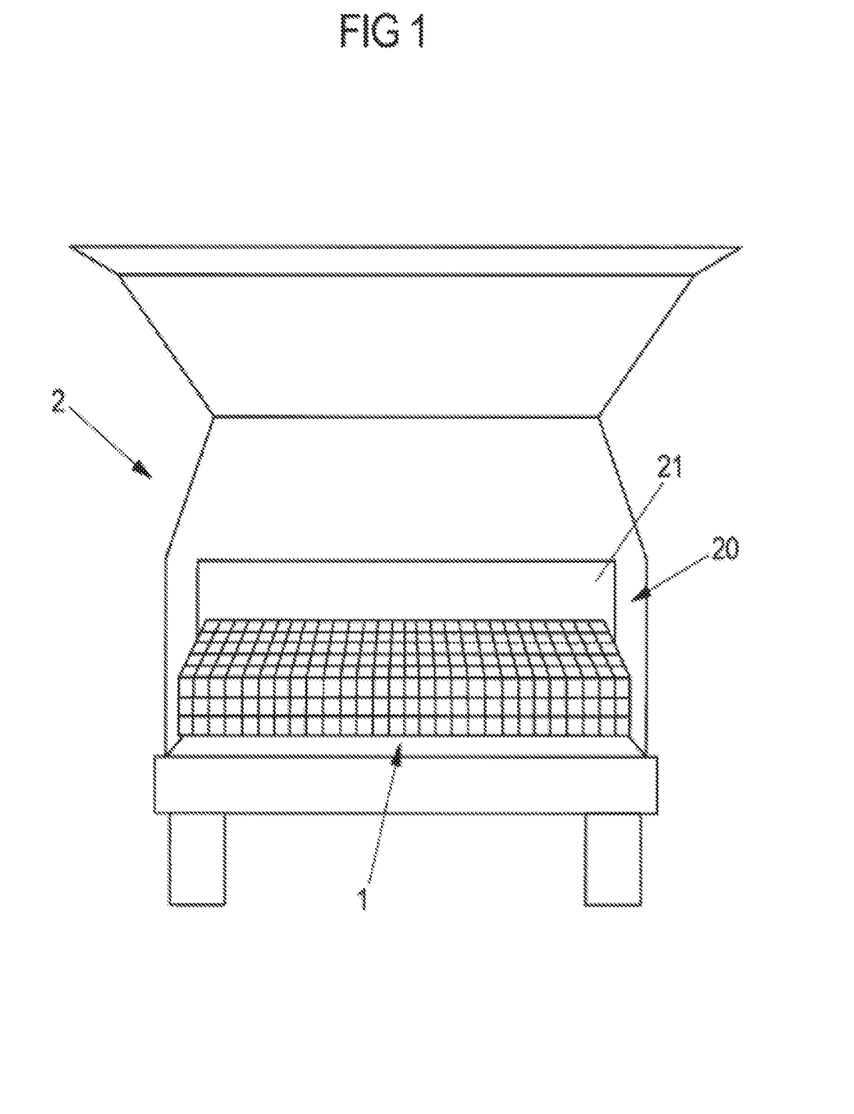
FIG. 1 shows a schematic view of a vehicle with a net assembly in a vehicle luggage compartment.

FIG. 1 shows, in a schematic view, a vehicle 2 with a luggage compartment 20, in which a net assembly 1 for covering part of the luggage compartment 20 at least in regions is arranged.

The net assembly 1 can serve, for example, for fixing goods on the rear side of a rear seat arrangement 21 in the region of a floor of the luggage compartment 20.

An exemplary embodiment of such a net assembly 1 is shown in FIG. 2 to FIG. 7A, 7B.

Figure 2:
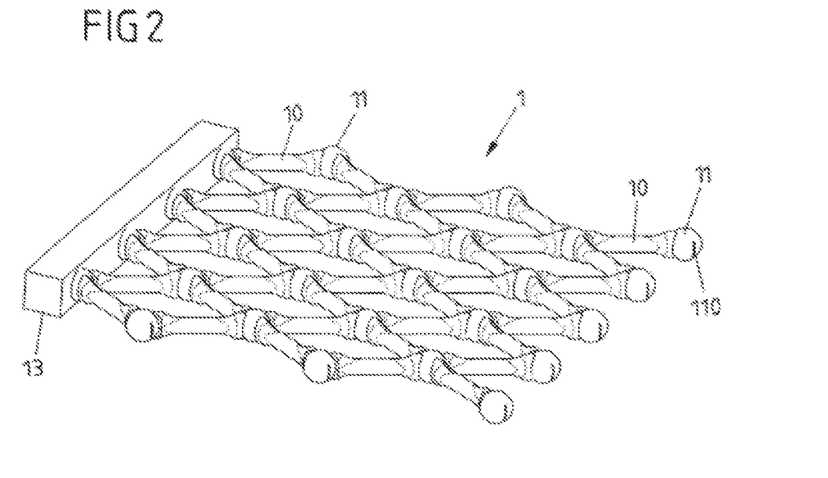
FIG. 2 shows a view of an exemplary embodiment of a net assembly.

In the exemplary embodiment illustrated, the net assembly 1 extends from an end strip 13 via which the net assembly 1 can be fastened, for example, in a vehicle 2, for example in the region of a vehicle floor of the luggage compartment 20. The net assembly 1 has rod members 10 which are inherently rigid and extend in a rod-shaped manner. The rod members 10 together form a net-like structure with diamond-shaped openings and are connected to one another via joint elements 11 in such a manner that the shape of the net assembly 1 can be set and varied in a flexible manner.

As emerges in particular from FIG. 6A, 6B and FIG. 7A, 7B, each rod member 10 has a guide channel 101 which extends between ends 103, 104 of the respective rod member 10. A tensioning element 12 extends in the guide channels 101 of the rod members 10 in the form of a tension cable, for example a plastics cable or a steel cable, which serves to brace the rod members 10 to one another with the interposition of the joint elements 11 in order to fix the position of the rod members 10 relative to one another depending on the tension at the tensioning element 12 or to enable flexible adaptation of the shape of the net assembly 1.

The guide channels 101 extend longitudinally through the rod members 10. A connecting opening 111 in the form of a curved channel is formed within the joint element 11, which is arranged between two adjacent rod members 10, said connecting opening via a respective angular opening 110 on the outer surface of the joint element 11 and serving to guide the tensioning element 12 through the joint element 11.

The angular openings 110 are each formed in a slot-shaped manner in a pivoting plane, within which an associated rod member 10 is pivotable with respect to the joint element 11, and widen radially outward from the central connecting opening 111. The shaping of the angular opening 110 predetermines the angular range a within which an associated rod member 10 is pivotable with respect to the joint element 11. For example, the angular openings 110 can each have an opening angle α of between 45° and 90°.

Owing to the fact that each rod member 10 is assigned an angular opening 110 of the joint element 11, each rod member 10 can be pivoted with respect to the joint element 11 by the pivoting angle predetermined by the opening angle α of the associated angular opening 110. The tensioning element 12 is moveable within the angular opening 110, and therefore the tensioning element 12 can be introduced from the guide channel 101 of the associated rod member 10 via the angular opening 110 into the connecting opening 111 of the joint element 11.

Figure 6A:
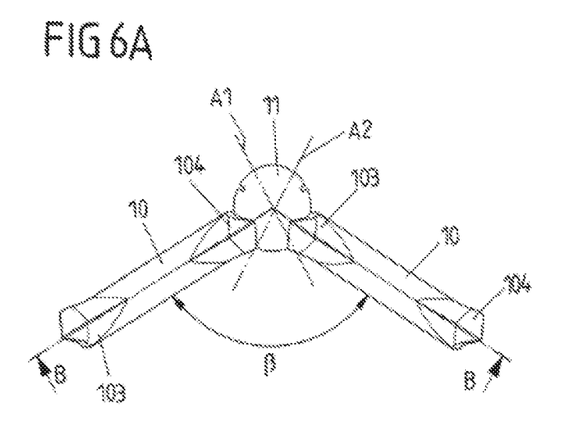
FIG. 6A shows a top view of two adjacent rod members on a joint element.

By means of the provision of the slot-shaped angular openings 110 on the joint element 11, the associated rod members 10 are pivotable with respect to the joint element 11 about a respective pivot axis A1, A2 (directed perpendicularly to the pivoting plane), as is illustrated in FIG. 6A.

Figure 7A:
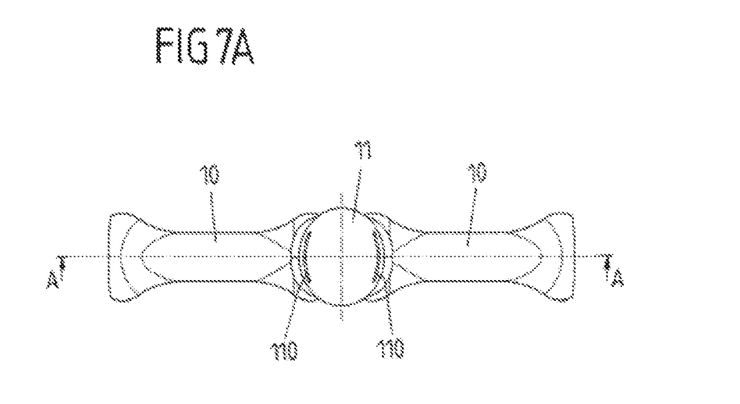
FIG. 7A shows a side view of the two adjacent rod members on the joint element.
Figure 7B:
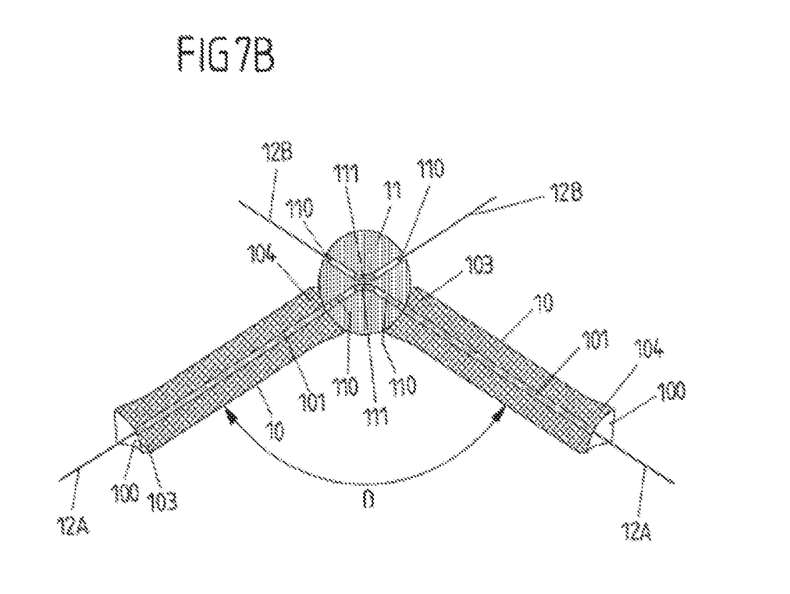
FIG. 7B shows a sectional view along the line A-A according to FIG. 7A.

As is apparent from the sectional view according to FIG. 7B, the connecting opening 111 is curved within the joint element 11. A pair of adjacent rod members 10 extends at an angle with respect to each other, and the tensioning element 12 correspondingly runs through the guide channels 101 of the adjacent rod members 10 and is deflected in the associated connecting opening 111 within the joint element 11.

Figure 4:
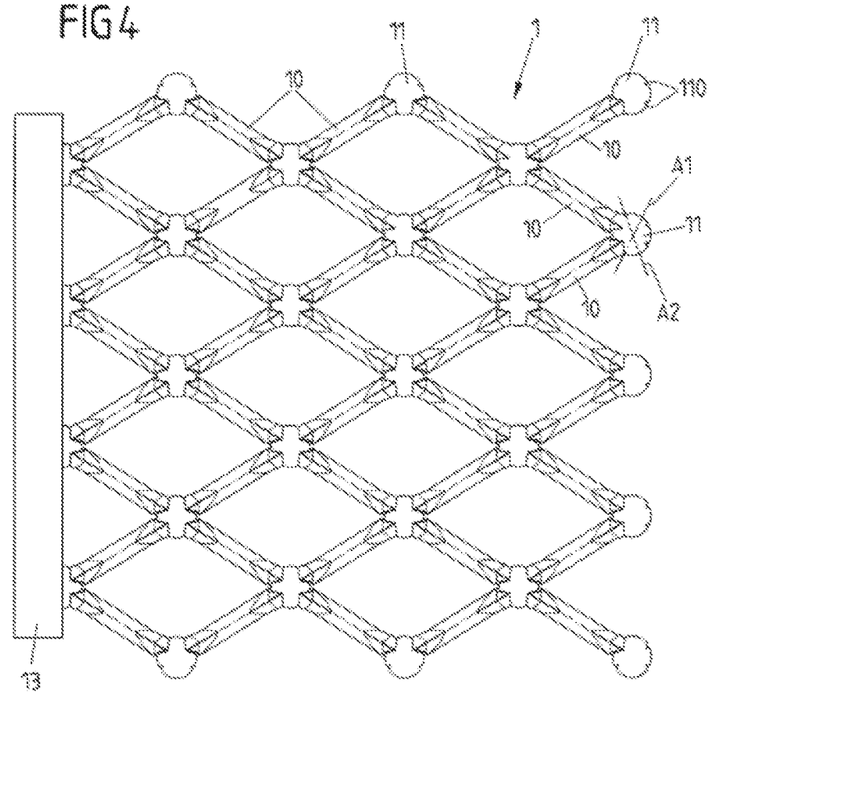
FIG. 4 shows a top view of the net assembly.
Figure 5:
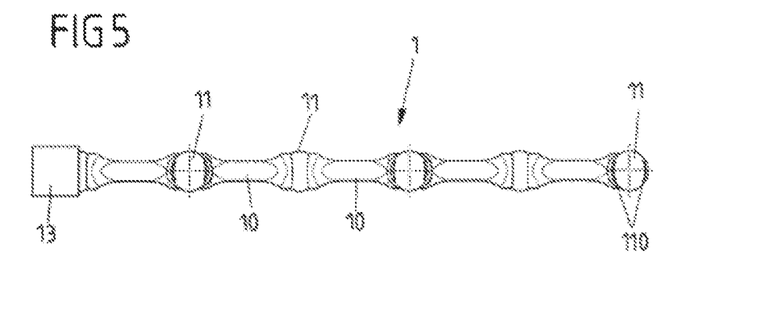
FIG. 5 shows a side view of the net assembly.

As is apparent from FIG. 7B in conjunction with FIGS. 2 and 4, each joint element 11 is assigned two pairs of adjacent rod members 10, and the joint element 11, as is apparent from the sectional view according to FIG. 7B, accordingly has two connecting openings 111 which are curved oppositely to each other. The pairs of rod members 10 extend in a mirror-inverted manner with respect to each other on the joint element 11. Each rod member 10 is assigned an angular opening 110 on the joint element 11, and each rod member 10 is correspondingly pivotable with respect to the joint element 11 about a defined pivot axis A1, A2 within the angular range a predetermined by the angular opening 110.

The pairs of rod members 10 can be braced with respect to one another and with the joint element 11 via different portions 12A, 12B of the same tensioning element 12 or by two different tensioning elements 12A, 12B, as is shown schematically in FIG. 7B. Accordingly, different portions 12A, 12B of the same tensioning element 12 or different tensioning elements 12A, 12B can extend through the connecting openings 111 between the rod members 10 assigned in pairs to one another.

Alternatively to the guiding, illustrated in FIGS. 6A, 6B and 7A, 7B, of the tensioning element 12 through the rod members 10 and the joint elements 11, the tensioning element 12 can also be guided rectilinearly (without a deflection in the connecting opening 111) through the joint element 10 and can therefore extend diagonally along rod members 10 arranged in rows next to one another (diagonally through the net assembly 1).

When the tensioning element 12 is relaxed, the rod members 12 of the net assembly 1 can be changed in their pivoting position with respect to one another, and therefore the shape of the net assembly 1 can be flexibly adapted. By tensioning one or more tensioning elements 12 which extend through the rod members 10 and the joint elements 11, the rod members 10 and the joint elements 11 can then be fixed with respect to one another in their position just taken up by a frictional connection being created between contact surfaces 100, via which the rod members 10 lie against respectively associated joint elements 11, and the joint elements 11 and the rod members 10 therefore being secured in a load-bearing manner with respect to the joint elements 11.

Figure 3:
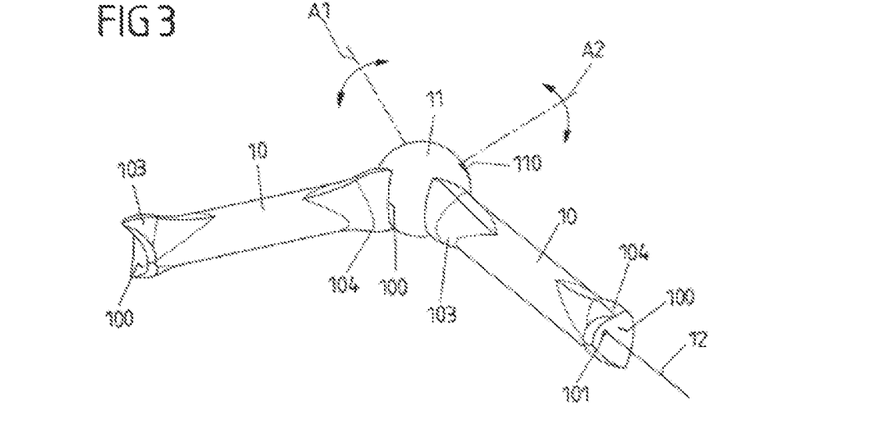
FIG. 3 shows a view of two adjacent rod members on a joint element.
Figure 6B:
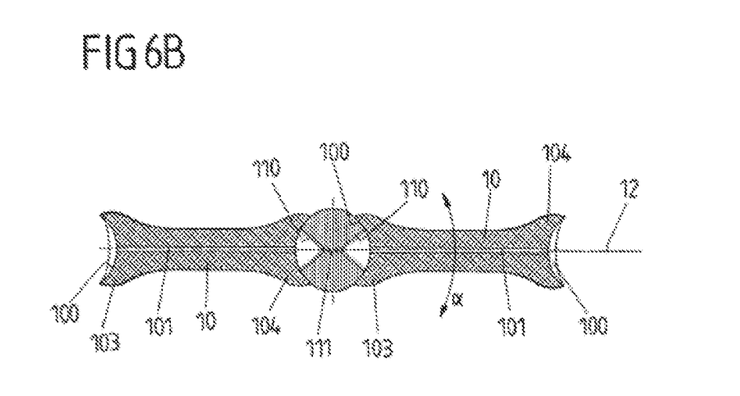
FIG. 6B shows a sectional view along the line B-B according to FIG. 6A.

As can be seen, for example, from FIG. 3 and FIG. 6B, the rod members 10 are shaped concavely on their contact surfaces 100, corresponding to the ball shape of the associated joint elements 11, and therefore planar contact against the associated joint elements 11 is created via the contact surfaces 100.

In the exemplary embodiment illustrated, the tensioning element 12 extends along a neutral fiber through the rod members 10 and the joint elements 11 in such a manner that a change in the position of the rod members 10 on the joint elements 11 does not lead to a change in the length of the extension path of the tensioning element 12 through the rod members 10 and the joint elements 11. In order to adjust the net assembly 1, the tensioning element 12 can be relaxed. If a desired position of the net assembly 1 is achieved, the rod members 10 and the joint elements 11 can in turn be braced with respect to one another such that the net assembly 1 is fixed in its position which is then taken up.

Figure 8:
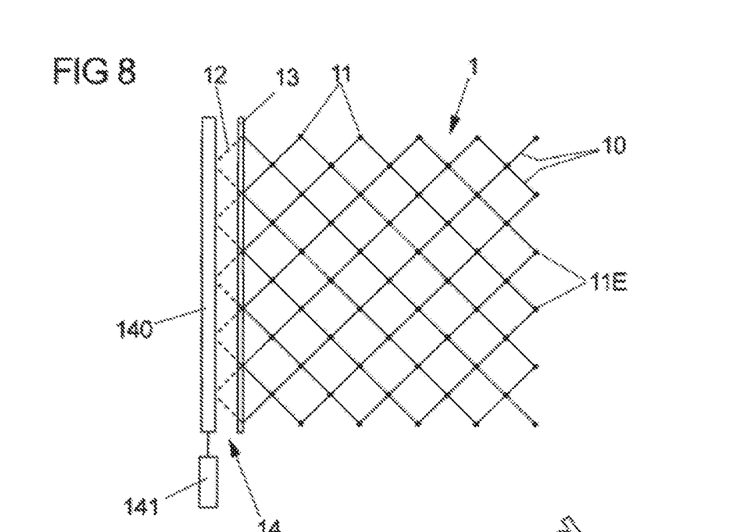
FIG. 8 shows a schematic view of a net assembly with a tensioning device.

In order to vary the tension at the one or more tensioning elements 12, a tensioning device 14 can be provided, as illustrated schematically in FIG. 8, which has a tensioning strip 140 on which one or more tensioning elements 12 are secured and the position of which with respect to the end strip 13 of the net assembly 1 can be varied in order to change the tension at the tensioning elements 12.

The tensioning device 14 has one or more servo motors 141 via which, for example, the tensioning strip 140 can be moved.

Alternatively, a respective separate servo motor 141 can be assigned to different tensioning elements 12 such that the tension at different tensioning elements 12 can be set and varied in an individual manner.

The net assembly 1 can be fastened in or to the vehicle 2 via the end strip 13. However, it is also conceivable and possible additionally to fasten end-side joint elements 11E which are remote from the end strip 13 to the vehicle floor.

Alternatively, the net assembly 1 can also be fastened in or to the vehicle, for example to a vehicle floor, only via one or more corners.

Joint elements 11E on the end side can be designed for deflecting a tensioning element 12 or alternatively for the end-side fastening of one end of the tensioning element 12 in order to deflect the tensioning element 12 or to provide an end point for the tensioning element 12.

Figure 9:
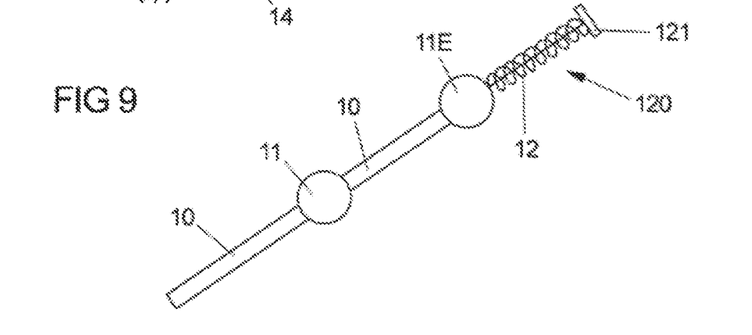
FIG. 9 shows a schematic view of the net assembly with a spring element for tensioning a tensioning element.

Additionally or alternatively to a tensioning device 14, the tensioning element 12 can be elastically pretensioned via a spring element 120, as is illustrated schematically in FIG. 9. Such a spring element 12 can act, for example, between a joint element 11E on the end side and a tensioning plate 121, to which the tensioning element 12 is fastened. Such an elastic pretension via one or more spring elements 120 makes it possible to provide an elasticity in the net assembly 1, which makes it possible to flexibly shape same by, for example, manually deforming the net assembly 1.

Figure 10:
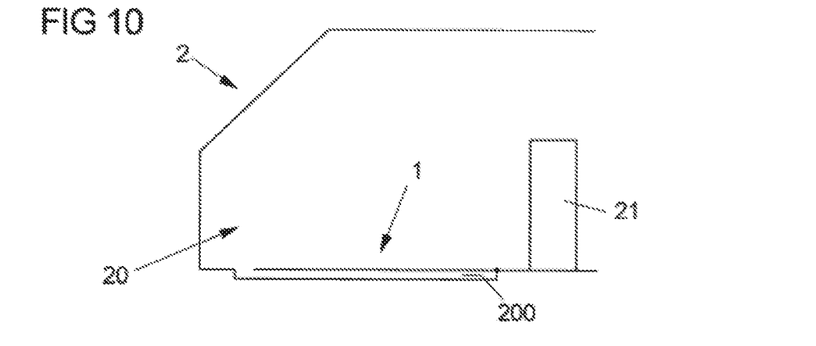
FIG. 10 shows a schematic view of the net assembly in a luggage compartment of a vehicle.

As illustrated schematically in FIG. 10, the net assembly 1 can be arranged in an associated depression 200 of a luggage compartment floor of a luggage compartment 20 of a vehicle 2 (what is referred to as a negative impression). Accordingly, in a non-use position, the net assembly 1 is accommodated in the region of the luggage compartment floor and therefore does not get in the way. The net assembly 1 can be deformed from the non-use position in order, for example, to cover and to fix goods in the luggage compartment 20.

Figure 11:
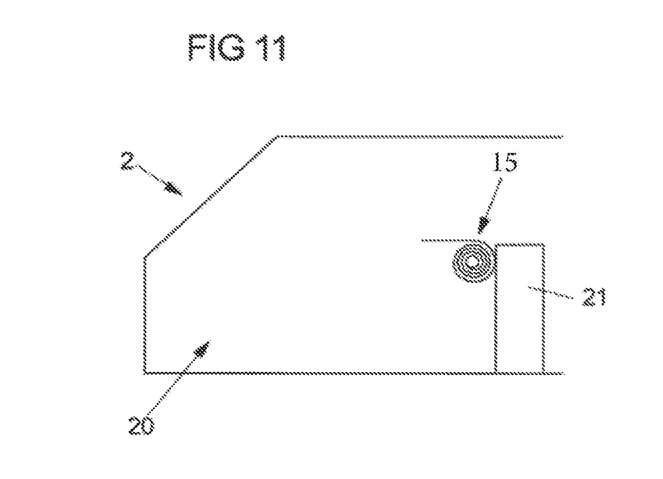
FIG. 11 shows a schematic view of another arrangement of the net assembly in a luggage compartment of a vehicle.

As another example, the net assembly 1 can also be arranged on a winding device 15 which, for example, has a winding shaft and an electric motor drive or spring mechanism drive, and can be wound up onto the winding device 15 or can be unwound from the winding device 15, as is illustrated schematically in FIG. 11. The net assembly 1 can therefore be stored in a compact manner in a storage position in the vehicle 2.

Figure 12:
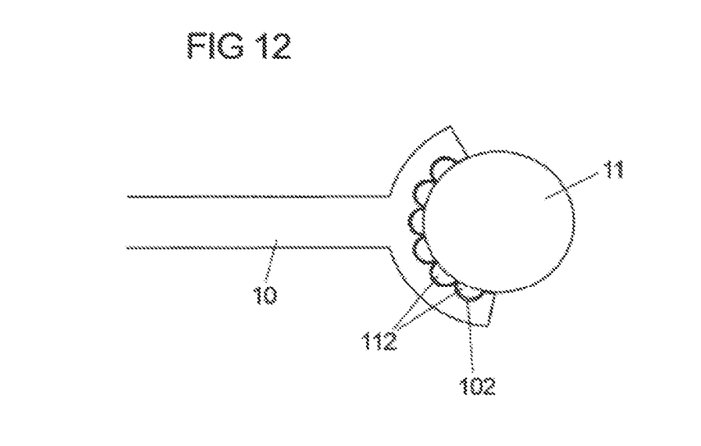
FIG. 12 shows a schematic view of a rod member on a joint element, with positive locking elements for fixing the connection between the rod member and the joint element.

In the exemplary embodiment described with reference to FIGS. 2 to 7A, 7B, the rod members 10 are in contact in a planar and sliding manner with joint elements 11 via contact surfaces 100. In order to improve the support of the rod members 10 on the joint elements 11 and to fix the position of the rod members 10 with respect to the joint elements 11, positive locking elements 102, 112, for example in the form of (rounded) teeth, can be arranged as illustrated schematically in an exemplary embodiment of FIG. 12 on the joint elements 11 and the rod members 10, said positive locking elements being in engagement with one another in a positive locking manner when the tensioning element 12 is braced and therefore fixing the position of the respective rod member 10 with respect to the associated joint element 11 in a load-bearing manner. Removal of the tension enables the positive locking elements 102, 112 to slide over one another, and therefore the net assembly 1 can be deformed by adjustment of the rod members 10.

A net assembly 1 of the type described can be used in an entirely different manner on a vehicle 2.

A net assembly 1 of the type described can bring about, for example, a luggage compartment covering for covering a luggage compartment 20 in the region of the luggage compartment floor (as is illustrated schematically in FIG. 10) or else above the luggage compartment floor (as is illustrated schematically in FIG. 11).

Alternatively, a net assembly 1 can also serve for fixing a vehicle occupant on a vehicle seat or can provide a flexible, but fixable storage area within a vehicle 2.

Alternatively, in turn, a net assembly 1 of the type described can also be used as a snow chain on a vehicle tire.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

1 Net assembly
10 Rod member
100 Contact surface
101 Guide channel
102 Positive locking elements
103, 104 End
11, 11E Joint element
110 Angular opening
111 Connecting opening
112 Positive locking elements
12, 12A, 12B Tensioning element
120 Spring element
121 Tensioning plate 13 End strip
14 Tensioning device
140 Tensioning strip
141 Servo motor
15 Winding device
2 Vehicle
20 Luggage compartment
200 Receiving depression
21 Rear seat arrangement
α, β Angle
A1, A2 Pivot axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A net assembly for a vehicle comprising:
   an assembly of rod members wherein each of the rod members define a guide channel;
   a plurality of joint elements each defining a connecting opening, wherein a number of joint elements of the plurality of joint elements connect a number of rod members of the assembly of rod members to one another, wherein each of the joint elements is formed as a ball element; and
   at least one tensioning element extending through at least one of the guide channels and through at least one of the connecting openings, wherein the at least one tensioning element is configured to be tensioned to brace each of the rod members of the assembly of rod members with respect to the each of the joint elements of the plurality of joint elements.

2. The net assembly of claim 1, wherein each of the rod members includes two ends, wherein the guide channel extends between the two ends.

3. The net assembly of claim 2, wherein each end of the two ends includes a contact surface, wherein each contact surface contacts a joint element of the plurality of joint elements.

4. The net assembly of claim 3, wherein at least one positive locking element disposed on the contact surface and configured to provide a positive locking connection between the contact surface and a joint element of the plurality of joint elements.

5. The net assembly of claim 1, wherein a joint element of the plurality of joint elements is disposed between two adjacent rod members of the assembly of rod members.

6. The net assembly of claim 5, wherein the two adjacent rod members are each pivotable about a pivot axis with respect to the joint element of the plurality of joint elements.

7. The net assembly of claim 5, wherein the at least one tensioning element extends from a guide channel of a first rod member of the two adjacent rod members and through a connecting opening of a joint element of the plurality of joint elements arranged between the two adjacent rod members and into a guide channel of a second rod member of the two adjacent rod members.

8. The net assembly of claim 7, wherein the first rod member of the two adjacent rod members and a second rod member of the two adjacent rod members extend from the joint element to form an angle (β) between the first rod member and the second rod member of the two adjacent rod members.

9. The net assembly of claim 8, wherein the connecting opening is curved and guides the at least one tensioning element between one of the two adjacent rod members and another rod member of the two adjacent rod members.

10. The net assembly of claim 9, wherein the joint element, arranged between a first rod member and a second rod member of the two adjacent rod members, defines for each rod member of the two adjacent rod members, an angular opening connected to the connecting opening, wherein the angular opening guides the at least one tensioning element between a first guide channel of the first rod member, a second guide channel of the second rod member, and the connecting opening of the joint element.

11. The net assembly of claim 10, wherein the joint element defines a slot extending along a pivot plane, wherein the slot forms the angular opening, wherein an adjacent rod member is pivotable about the pivot plane.

12. The net assembly of claim 10, wherein the angular opening widens from the connecting opening.

13. The net assembly of claim 12, wherein the angular opening has an opening angle (α) ranging between 45° and 90°.

14. The net assembly of claim 1, wherein at least two pairs of adjacent rod members of the rod assembly lie against one or more of the plurality of joint elements.

15. The net assembly of claim 1, wherein the assembly of rod members includes a first rod member and a second rod member, disposed adjacent to the first rod member, wherein the first rod member and the second rod member each define an extension path, wherein the at least one tensioning element extends along the extension path, through the rod members, and through a first joint element of the plurality of joint elements so that as the first and second rod members pivot relative to one another a length of the extension path does not change.

16. The net assembly of claim 1, further comprising a servo motor, wherein the servo motor is configured to actuate and tension the at least one tensioning element.

17. The net assembly of claim 1, further comprising a spring element configured to tension the at least one tensioning element.

18. The net assembly of claim 1, further comprising a winding device configured to wind up the assembly of rod members, the plurality of joint elements, and the at least one tensioning element.

19. A net assembly for a vehicle comprising:
   an assembly of rod members, wherein each of the rod members define a guide channel and wherein at least two pairs of adjacent rod members of the rod assembly lie against one or more of the plurality of joint elements;
   a plurality of joint elements each defining a connecting opening, wherein a number of joint elements of the plurality of joint elements connect a number of rod members of the assembly of rod members to one another; and
   at least one tensioning element extending through at least one of the guide channels and through at least one of the connecting openings, wherein the at least one tensioning element is configured to be tensioned to brace each of the rod members of the assembly of rod members with respect to the each of the joint elements of the plurality of joint elements, wherein each of the plurality of joint elements each define a first connecting opening and a second connecting opening, wherein the assembly of rod members includes a first rod member and a second rod member, disposed adjacent to the first rod member, wherein the first connecting opening receives the first rod member and the second connecting opening receives the second rod member to guide a tensioning element of the plurality of tensioning elements coupled to the first and second rod members.

20. The net assembly of claim 19, further comprising a spring element configured to tension the at least one tensioning element.

21. A net assembly for use in luggage compartment of a vehicle including a rear seat, the net assembly comprising:
- a plurality of joint elements each defining at least one opening;
- a plurality of rod members, wherein a number of rod members include a first end and a second end, wherein the first end includes a positive locking element configured to engage a first joint element of the plurality of joint elements; and
- a tensioning element extending through a number of joint elements of the plurality of joint elements and a number of rod members of the plurality of rod members, wherein the tensioning element is configured to tension each of a first rod member and a second rod member, and each of the plurality of rod members with respect to the first joint element of the plurality of joint elements.

* * * * *